United States Patent [19]

Vanlier

[11] Patent Number: 4,607,501
[45] Date of Patent: Aug. 26, 1986

[54] CONDENSING AND COLLECTING VAPORS EMANATING FROM A LAND SURFACE

[76] Inventor: Kenneth E. Vanlier, 2195 Greenskeeper Ct., Reston, Va. 22091

[21] Appl. No.: 662,552

[22] Filed: Oct. 19, 1984

[51] Int. Cl.$^4$ .................................................. F25D 21/14
[52] U.S. Cl. ...................................... 62/288; 202/234; 73/863.11
[58] Field of Search .......................... 62/93, 285, 288; 203/DIG. 1; 202/234; 55/83; 73/863.11, 863.12

[56] References Cited

U.S. PATENT DOCUMENTS

| | | | |
|---|---|---|---|
| 2,203,685 | 6/1940 | Kaufman | 62/93 |
| 3,221,558 | 12/1965 | Lagergren | 73/863.11 |
| 3,290,230 | 12/1966 | Kobayashi | 202/234 |
| 3,337,418 | 8/1967 | Halacy, Jr. | 202/234 X |
| 3,351,538 | 11/1967 | Andrassy | 202/234 |
| 3,436,313 | 4/1969 | Van Bavel et al. | 202/83 |
| 3,575,009 | 4/1971 | Kooney | 62/93 X |

Primary Examiner—William E. Wayner
Attorney, Agent, or Firm—Nixon & Vanderhye

[57] ABSTRACT

Vapors of chemicals or minerals in solution, and/or volatile liquids, emanating from a land surface (such as a sanitary landfill) are collected. A first generally cylindrical container encloses the volume of air above an area of land surface, and includes a top surface having an inverted cone shape with a downwardmost point formed by the cone apex. A second generally cylindrical container interfits with the top, inverted cone, first container. The second container is adapted to contain ice, or a like cooling solid or liquid. The second and first containers are of good heat conducting material so that the second container cools the top of the first container. Thus vapors emanating from the land surface condense on the top of the first container, roll down the interior surface thereof to the cone apex, and the condensate drips into a collecting vessel disposed within the first container, below the cone apex. A cover of heat insulating material is placed on top of the first container, and completely surrounds the second container to insulate it from the environment. The insulating cover, and first and second containers are preferably of opaque material, and are dimensioned and shaped so that they nest for ease of transportation. The collected condensate is analyzed to determine the mineral and chemical composition thereof.

12 Claims, 3 Drawing Figures

CONDENSING AND COLLECTING VAPORS EMANATING FROM A LAND SURFACE

BACKGROUND AND SUMMARY OF THE INVENTION

There are circumstances in which it is desirable to be able to determine mineral and chemical constituents (such as pollutants) in a given land surface area. Typically, it is necessary to disturb the land surface area in order to collect soil, remove liquids from the soil, and test the liquids. However it is desirable if the determination of mineral and/or chemical constituents of a given land surface area can be determined without soil disturbance.

Procedures have been in existence for many years for the extraction of potable water from a land area. A typical procedure has been to provide a transparent enclosing structure over a land area, which allows sunlight to pass therethrough causing water vapor to emanate from the soil, and then to condense the water vapor on a surface that is at ambient conditions, which typically would be at a temperature less than the temperature of the water vapor rising from the earth as a result of a contemporaneous solar heating of the earth.

According to the present invention, apparatus is provided which may be utilized for the production of potable water, and also may be utilized to determine the chemical and mineral constituents in a land surface area which includes minerals and chemicals in solution, and/or volatile liquids. The apparatus according to the present invention allows these functions to be performed without any necessity for disturbing the land surface with which it is to be utilized, and additionally accomplishes such functions without relying on sunshine being present (and thus can be used successfully during cloudy periods, and at night, as long as the land surface is relatively warm).

Also, according to the present invention a method is provided for collecting vapors of minerals and chemicals in solution, and volatile liquids, from a land surface, which vapors ultimately can be utilized to determine what constituents (e.g. pollutants) are present in the land area. The method is particularly useful in association with sanitary landfills, or areas where significant pollution or chemical contamination is predicted.

According to one aspect of the present invention, apparatus is provided for condensing and collecting vapors emanating from a land surface. The apparatus includes means for enclosing the volume of air above an area of a land surface, including a top member. The apparatus also includes means for positively cooling the top member so that vapors emanating from the land surface area will condense on the top member, and means are provided for collecting the condensation that forms on the top member. Typically the enclosing means comprises a cylindrical container having an open bottom, and the top member has an inverted cone shape with an apex as its downwardmost point. A collecting container is disposed within the enclosing container below the cone apex. A second container, filled with ice or a like cooling liquid or fluid, is disposed in heat conductive association with the enclosure top member, to provide the means for positively cooling the top member. An insulating cover is preferably disposed on the enclosure, and surrounding the ice container to thermally insulate it from the surrounding environment. The insulated cover, ice container, and enclosing container preferably nest within each other for ease of transportation. They all are preferably formed of opaque materials, and it is not necessary for there to be sunshine at the time that they are operational.

According to another aspect of the present invention, a method of collecting vapors of mineral and chemical materials in solution, and volatile liquids, from a land surface is provided. The method comprises the following steps: (a) enclosing a volume of air above an area of a land surface; (b) collecting vapors of minerals and chemicals in solution, and/or volatile liquids, emanating from said land surface area; and (c) analyzing the vapors collected to determine mineral and chemical constituencies of the vapors.

Step (a) is practiced without disturbing the land surface, and may be practiced on substantially flat ground. Step (b) is practiced by effecting condensation of the vapors by positively cooling the vapors, and then collecting them, as by utilizing the containers mentioned above. The method is particularly applicable to sanitary land fills, or like areas where pollutants or contaminants might be expected, and step (c) is practiced utilizing conventional equipment for analyzing small volumes of liquid to determine the chemical and mineral constituencies thereof.

It is the primary object of the present invention to provide a versatile and effective method and apparatus for collecting vapors emanating from a land surface. This and other objects of the invention will become clear from an inspection of the detailed description of the invention, and from the appended claims.

DETAILED DESCRIPTION OF THE DRAWINGS

Figure 1:
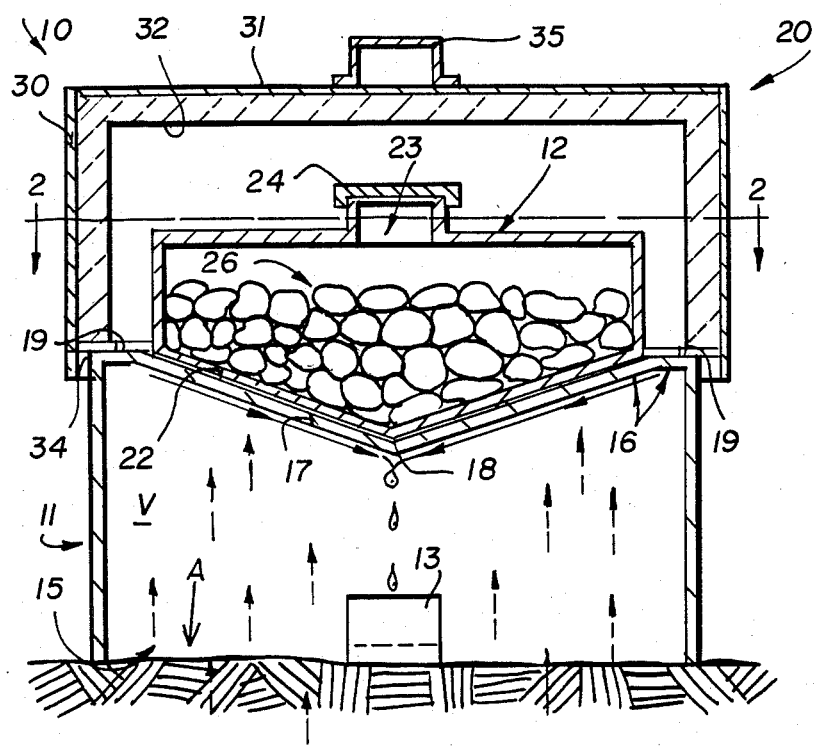
FIG. 1 is a side cross-sectional view, with a sample container shown in elevation, of exemplary apparatus according to the present invention.
Figure 2:
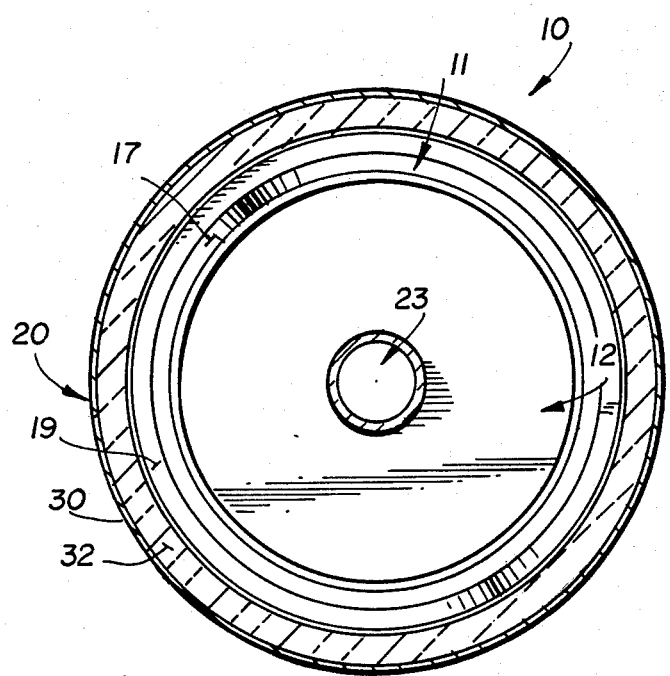
FIG. 2 is a top cross-sectional view taken along lines 2—2 of FIG. 1.
Figure 3:
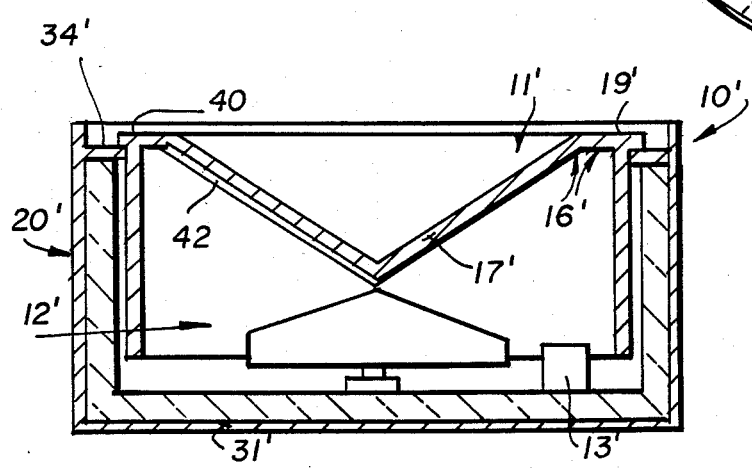
FIG. 3 is a side cross-sectional view, with the ice container and sample container shown in elevation, of a modification of the components of FIG. 1, the components shown in a nested configuration for ease of transportation.

The basic components of the apparatus according to the present invention, which apparatus is shown generally by reference numeral 10 in FIGS. 1 and 2, and 10' in FIG. 3, comprises a first container 11 and a second container 12, with a sample container or pan 13 adapted to be associated therewith. The first container 11 preferably is a generally cylindrical container, and also preferably a circular in cross-section, as can be seen in FIG. 2. It includes a first open end 15 (see FIG. 1) and a second closed end, provided by the top member 16. The top member 16 preferably has an inverted cone shape, as illustrated by reference numeral 17, terminating in an apex 18 which is the downwardmost point thereof. The cone 17 provides a downwardly sloping surface on which condensate may form, and the container 11 in general comprises means for enclosing a volume V (see FIG. 1) of air above a land surface area A.

The container 11 preferably is of good heat conducting material, and particularly the top member 16 thereof is of good heat conductive material. For instance the container 11 is formed of stainless steel, or a like metal.

The container 11 also is preferably of opaque material, although it is not necessary for it to be of opaque material in order to function properly.

The container 11 is constructed so that the spacing between the apex 18 of the inverted cone portion 17 thereof, and the first end opening 15, is great enough to allow disposition of the collecting pan 13 therein, as seen in FIG. 1 with the pan 13 disposed directly below the apex 18. Also, preferably around the circumferential periphery of the top member 16 a flat annular portion 19 is provided which cooperates with an insulating cover 20, to be hereinafter described.

The second container 12 comprises an ice chamber, which includes a bottom member 22 which is shaped and dimensioned to interfit with the inverted cone 17, as clearly illustrated in FIG. 1. The container 12 also is preferably generally cylindrical, with a circular cross-section, and has a smaller diameter than the container 11. Preferably the container 12 includes means defining an opening 23 in the top end thereof, opposite the bottom conical portion 22, the opening 23 being closed by a removal cap 24 or the like. Upon removing the cap 24, ice 26—or like cooling solid or fluid material—may be inserted into, or removed from, the interior volume of the container 12.

The container 12 also is preferably of heat conducting material, such as stainless steel, and in particular the bottom member 22 must be of good heat conducting material. The ice 26 within the container 12 provides positive cooling of the inverted cone 17 of the container 11, by heat transfer between the members 22, 17, and thus the container 12 comprises means for positively cooling the top member 16 of container 11 so that vapors (see upwardly directed arrows in FIG. 1) emanating from the land surface area A will condense on the interior surface of the top member 16, flow downwardly along the interior surface thereof (see the arrows along the interior surface of the member 16 in FIG. 1), and the condensate will drip into the pan 13.

In order to allow the apparatus 10 to effectively operate for the maximum amount of time, it is preferred that a cover 20 including thermal insulating material be provided. The cover 20 comprises a third container which operatively engages the first container 11, and surrounds the second container 12 to thermally insulate it from the surrounding environment. The cover 20 also preferably is a generally cylindrical container, of circular cross-section.

In the embodiment of the cover 20 illustrated in FIG. 1, it will be seen that the cover 20 comprises a metal exterior shell 30 which includes a closed top surface 31, and a generally open bottom opposite the top surface 31. Affixed to the shell 30, 31 along the entire extent thereof is a thermally insulating material 32, such as styrofoam. A metal ring 34, adjacent (but spaced from) the open bottom of the shelf 30 preferably is provided to cooperate with the surface 19 of the first container 11 so that the first container 11 supports the insulated cover 20 in the operative position of the apparatus 10 (as illustrated in FIG. 1). A metal handle 35 or the like is affixed to the top surface 31, for ease of removal and replacement of the cover 20.

It is preferred that the components of the apparatus 10 be dimensioned and shaped so that they can nest together when not in use, for ease of transportation. A modified form of the apparatus 10' is illustrated in FIG. 3 which shows one exemplary construction of the components that allows for easy nesting thereof. In the FIG. 3 embodiment, structures comparable to those in the FIGS. 1 and 2 embodiment are illustrated by the same reference numeral only followed by a "'".

As seen in FIG. 3, the cover 20' has the largest diameter, and the enclosing container 11' in the nested configuration is disposed essentially completely within the interior volume of the cover 20'. Note that the ring 34' adjacent the open end of the cover 20' supports an annular flange 40 which is a continuation of the surface 19' of the top 16' of the first container 11'. If desired, the surfaces 40, 34' can be releasably attached together (as by clamping, bolting, or the like) during transportation of the apparatus 10', to maintain the components together.

As it clear from FIG. 3, the ice chamber 12' is completely disposed within the volume defined by the cover 20' in the nesting configuration, and preferably is between the surface 31' of the cover 20' and the inverted cone portion 17' of the first container 11'. Also the collecting pan 13' may be readily disposed in that volume. In order to prevent damage to the components during transportation, packing material (not shown) may be disposed between the components 11', 12', 13', 20', in order to prevent shifting of the components with respect to each other.

In the embodiment illustrated in FIG. 3, note that the interior surface of the conical top member 17' of the container 11' has a coating 42 thereon. The coating 42 preferably is of porcelain, or a like material that will not be degraded by condensate forming, and flowing along, the interior surface of the conical member 17', and thus will protect the metal, or like material, of which the member 17' is constructed without significantly adversely affecting its good thermal conductivity.

FIG. 1 clearly illustrates the use of the apparatus 10 for practicing an exemplary method according to the present invention for collecting vapors of minerals or chemicals in solution, and/or volatile chemicals, from a land surface area A. The first container 11 has been put in place over the area A, enclosing a volume of air V above the area A. Vapors commonly emanate from most land areas, and particularly so when the land area is relatively warm (as a result of sunshine previously impacting thereon, hot weather, etc.). The container 12, filled with ice 26, has been disposed so that the members 22, 17 interfit, in heat conducting relationship, making the interior surface of the inverted conical member 17 significantly colder than the vapors emanating from the land area A. The cover 20 is supported by the first container 11, and surrounds the ice chamber 12 to thermally insulate it from the surrounding environment so that the vast majority of the heat transfer from the container 12 is to the member 17, and not the ambient atmosphere.

Vapors which emanate from the land surface A impact the interior surface of the inverted conical member 17, and condense. The condensate flows down the downwardly slanted surface of the member 17, until it reaches the apex 18, at which point it forms into droplets which eventually drop into the pan 13. Once a few ounces of condensate have been collected, the cover 20, container 12, and container 11 may be removed from the ground area A, and the condensate in the container 13 taken for conventional laboratory analysis to determine the mineral and/or chemical constituents thereof.

Note that the method according to the invention is particularly applicable to volatile liquids that are found in the land surface area A, and additionally chemicals or minerals which are in solution with liquid in the area A and would have a tendency to be retained in the vapor emanating from the ground area A. Of course the apparatus 10 also could be utilized to collect potable water. Irrespective of the use to which the apparatus 10 is put, it will operate effectively even at times when there is no sunlight, and does not require disturbance of the land surface area A.

It will thus be seen that according to the present invention a method and apparatus have been provided for effectively, and in a versatile manner, collecting vapors emanating from a land surface area. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. Apparatus for condensing and collecting vapors emanating from a land surface, comprising:
   means for enclosing a volume of air above an area of a land surface, said means including a top member;
   means for positively cooling said top member so that vapors emanating from the area of land surface enclosed will condense on said top member; and
   means for collecting condensate which is formed on said top member;
   wherein said enclosing means top member has an inverted conical shape, and a downwardmost point comprising the apex of said inverted cone; and wherein said positive cooling means has a bottom member having a conical shape corresponding to, and interfitting with, said enclosing means top member inverted conical shape; and wherein said collecting means is in operative association with said apex.

2. Apparatus as recited in claim 1 wherein said enclosing means comprises a generally circular in cross-section, generally cylindrical, container having an open bottom opposite said top member.

3. Apparatus as recited in claim 2 wherein said container adapted to contain ice, or the like, is generally circular in cross-section, and generally cylindrical, and has means defining an opening for inserting or removing ice, or the like, into and from the container, said opening being disposed opposite said bottom member of said container.

4. Apparatus as recited in claim 1 further comprising a generally cylindrical, open bottom, insulated cover engaging said enclosing means, and insulating said container adapted to contain ice, or the like, from the surrounding environment.

5. Apparatus as recited in claim 1 further comprising insulating means in operative association with said enclosing means, and surrounding said means for positively cooling said top member, so as to effectively insulate said positive cooling means from the surrounding environment.

6. Vapor treating apparatus comprising:
   a first generally cylindrical container having a first, open, end, and a second, closed end;
   said second end of said first container having an inverted cone shape, including an apex;
   a second generally cylindrical container having a first end contoured to interfit with said first container second end;
   said first container second end, and said second container first end, of good heat conducting material; and
   said first end of said first container spaced from the apex of said first container second end inverted cone shape a distance sufficient to allow disposition of a collecting container therein.

7. Apparatus as recited in claim 6 further comprising a third generally cylindrical container of heat insulating material, said third container operatively engaging said first container at said second end thereof, and enclosing said second container to effect heat insulation of said second container from the surrounding environment.

8. Apparatus as recited in claim 7 wherein said third container includes a handle for ease of movement thereof.

9. Apparatus as recited in claim 7 wherein said first, second, and third containers are dimensioned so that said containers nest in a transporting configuration thereof, with said first container disposed essentially completely within said third container, and said second container disposed completely within said third container and between said first and third containers.

10. Apparatus as recited in claim 6 wherein said first container is constructed of opaque material.

11. Apparatus as recited in claim 7 wherein said first and third containers are constructed of opaque material.

12. Apparatus as recited in claim 6 wherein said first container second end is of metal, and has a coating of porcelain, or a like material which resists chemical degradation of the metal of said second end as a result of condensate forming thereon and moving along the interior surface thereof.

* * * * *